United States Patent [19]
Oshima et al.
[11] Patent Number: 4,857,245
[45] Date of Patent: Aug. 15, 1989

[54] METHOD OF DRYING CERAMIC CYLINDRICAL BODIES

[75] Inventors: Shinji Oshima, Ama; Hiromi Shimada, Nagoya, both of Japan
[73] Assignee: NGK Insulators, Ltd., Nagoya, Japan

[21] Appl. No.: 101,405
[22] Filed: Sep. 28, 1987
[30] Foreign Application Priority Data
Oct. 18, 1986 [JP] Japan ................................ 61-248149
[51] Int. Cl.⁴ ................................................ B29C 47/86
[52] U.S. Cl. ........................................ 264/25; 264/26; 264/211.11; 264/211.13; 264/211.18; 264/211.2; 264/500; 264/563
[58] Field of Search ....................... 264/211.11, 211.13, 264/211.18, 211.2, 25, 26, 500, 563

[56] References Cited
U.S. PATENT DOCUMENTS
2,032,624 3/1936 Lyons .................................... 264/22
2,952,877 9/1960 Park, Jr. ................................ 264/63
3,212,154 10/1965 Crumpler ............................ 425/380
3,527,851 9/1970 Bulgin ............................ 264/211.13
4,159,295 6/1979 Mazzuchelli et al. ................ 264/63
4,171,337 10/1979 Rosen et al. .......................... 264/56
4,496,501 1/1985 Linke et al. ........................... 264/37
4,579,707 4/1986 Kobayashi et al. ................... 264/63
FOREIGN PATENT DOCUMENTS
60-138710 9/1985 Japan .
60-203405 10/1985 Japan .
61-86470 5/1986 Japan .
61-108506 5/1986 Japan .
61-182921 8/1986 Japan .

*Primary Examiner*—James Derrington
*Attorney, Agent, or Firm*—Arnold, White & Durkee

[57] ABSTRACT

A ceramic cylindrical body just after extrusion-molding is held on a porous support at a floating state by air pressure and dried while supplying air to the inside of the ceramic cylindrical body.

5 Claims, 1 Drawing Sheet

METHOD OF DRYING CERAMIC CYLINDRICAL BODIES

BACKGROUND OF THE INVENTION

1. Field of the Invention

This invention relates to a method of drying an extruded ceramic cylindrical body used for obtaining thin and elongated ceramic cylindrical articles with high dimensional accuracy.

2. Related Art Statement

The shaping of a ceramic cylindrical body is usually performed by an extrusion-molding process. In this process, however, it is difficult to dry a soft ceramic cylindrical body just after the extrusion-molding without causing the deformation of the body. That is, in the conventional technique, the extruded ceramic cylindrical body has been dried by heating from an exterior through microwaves or the like while being held on a support coated with a lubricating oil. Therefore, the ceramic cylindrical body is undesirably deformed due to the frictional resistance between the ceramic body and the support before the drying, and also it is difficult to dry the inside of the ceramic cylindrical body and the contact portion with the support thereof and the strain is produced in the ceramic cylindrical body due to the uneven drying. In addition to the above process, there is a method wherein the ceramic cylindrical body is extruded in an up or down direction and dried without using the support. In this method, however, the ceramic cylindrical body is deformed by its own weight, so that it is substantially impossible to dry the ceramic cylindrical body while maintaining a high extruded dimensional accuracy.

SUMMARY OF THE INVENTION

It is an object of the invention to solve the aforementioned problems of the conventional techniques and provide a method of drying an extruded ceramic cylindrical body which can dry the ceramic cylindrical body just after the extrusion-molding without deformation thereof.

According to the invention, there is the provision of a method of drying an extruded ceramic cylindrical body, which comprises holding a ceramic cylindrical body, just after the extrusion-molding, on a porous support at a floating state by using an air pressure jetted from the inside of said support and drying said ceramic cylindrical body while supplying air to the inside of said ceramic cylindrical body.

DESCRIPTION OF THE PREFERRED EMBODIMENTS

The invention will be described in detail with respect to an illustrated embodiment.

Figure 1:
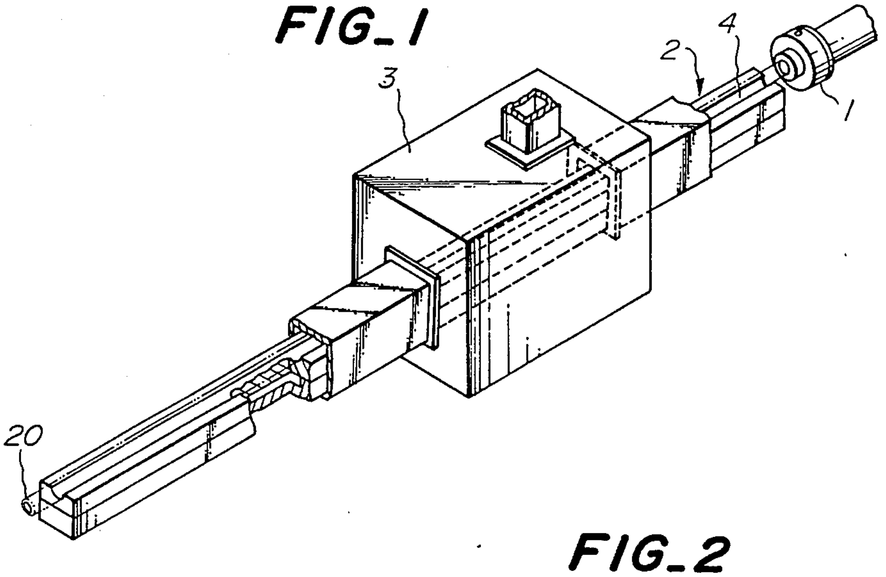
FIG. 1 is a partially cutaway perspective view of an extrusion drying apparatus used in the invention.
Figure 2:
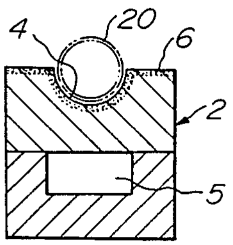
FIG. 2 is a sectional view of an embodiment of a support used in FIG. 1.

In FIG. 1, numeral 1 is a die of an extruder, numeral 2 a porous support horizontally arranged beneath the outlet of the die 1, and numeral 3 a drying chamber arranged in the course of the support 2. As shown in FIG. 2, the support 2 is provided at its upper surface with a recess portion 4 of a shape corresponding to a shape of a ceramic cylindrical body 20 extruded through the die 1 of the extruder and at its inside with an air reservoir 5 passing a compressed air of 0.1~20 kg/cm$^2$. Thus, the ceramic cylindrical body 20 just after the extrusion-molding can be held at a floating state by the compressed air. Moreover, in order to uniformly jet a large amount of air, it is favorable that a surface portion 6 of the support 2 has a porosity of 30~50% and a pore size of about 1~20 μm and the remaining portion thereof has a pore size of about 500 μm.

Figure 3:
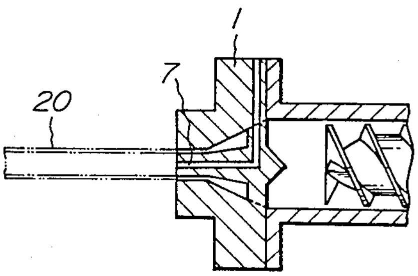
FIG. 3 is a longitudinal section view of a die of an extruder used in FIG. 1.

According to the invention, the soft ceramic cylindrical body 20 just after the extrusion-molding is held on the recess portion 4 of the support 2 at a floating state, while air, preferably hot air, is supplied to the inside of the ceramic cylindrical body 20 at this state. As show in FIG. 3, air is supplied through an air blowing hole 7 formed in the die 1 of the extruder, whereby steam is discharged from the inside of the ceramic cylindrical body 20 to the opening end thereof to promote the drying of the inside of the ceramic cylindrical body 20. On the other hand, since the drying chamber 3 arranged in the course of the support 2 is provided with an external heating means such as microwaves, hot air, infrared ray heat or the like, the ceramic cylindrical body 20 is dried by heating the outer surface while passing through the drying chamber 3.

Thus, according to the invention, the ceramic cylindrical body 20 is dried from its inner and outer surfaces while being floated on the support 2 by air pressure, so that there is no fear of causing deformation, because the frictional resistance between the ceramic cylindrical body 20 and the support 2 is approximately zero. Furthermore, the drying is performed from both the inner and outer surfaces, so that the extruded dimensional accuracy can be maintained sufficiently.

After the extruded ceramic cylindrical body 20 is cut into a given length at a floating state on the support 2, the cut body is freely rotated on the support 2 by applying a rotational force, whereby the drying can be performed more uniformly. In this case, when a liquid lubricant is previously impregnated in the inside of the porous support 2, it is foamed out with the jetting of the compressed air, whereby the frictional resistance is further reduced to make the extrusion and rotation more smooth. Particularly, when the infrared ray heater utilizing radiation heat is used as a heating means in the drying chamber 3, the rotating of the ceramic cylindrical body 20 on the support 2 is very effective for uniform drying. Moreover, a mechanical forced rotation means is usually used for rotating the ceramic cylindrical body 20, but the ceramic cylindrical body 20 may be rotated by making the air pressure jetted from the inside of the support 2 at either left or right side of the recess portion 4 large.

As mentioned above, according to the invention, the soft ceramic cylindrical body, just after the extrusion-molding, is held on the support at a floating state utilizing air pressure, during which the inner and outer surfaces thereof are uniformly dried, so that there is no fear of deforming the ceramic cylindrical body before and in the drying, and the extruded dimensional accuracy is maintained in the drying. Therefore, the invention is particularly suitable for extruding and drying thin and elongated ceramic cylinders and has a considerably high contribution to industrial development.

What is claimed is:

1. A method of drying an extruded ceramic cylindrical body, comprising:

providing a porous support immediately proximate to an extrusion opening of an extrusion die, said porous support including an upper surface having a recessed portion which corresponds to a shape of said extruded ceramic cylindrical body, a porosity of 30–50%, and a pore size of about 1–20 μm;

supporting an immediately extruded ceramic cylindrical body at a floating state on said porous support adjacent said upper surface by an air pressure jetted from an inside of said porous support through said upper surface;

drying said extruded ceramic cylindrical body while said body is at said floating state; and simultaneously supplying hot air to an inside of said extruded ceramic cylindrical body, such that said hot air provides drying of an inner portion of said extruded ceramic cylindrical body, whereby an outer portion of said body and the inner portion of said body are substantially simultaneously dried and said extruded ceramic cylindrical body is substantially free from deformation.

2. A method according to claim 1, further comprising cutting said extruded ceramic cylindrical body into a given length while said body is at said floating state and subsequently rotating said body on said porous support.

3. A method according to claim 1, wherein said drying said extruded ceramic cylindrical body is performed by an external drying means selected from the group consisting of microwaves, hot air and infrared ray heat.

4. A method according to claim 1, wherein said porous support includes a remaining portion having a pore size of about 500 μm.

5. A method according to claim 1, wherein said porous support includes a liquid lubricant initially impregnated therein.

* * * * *